(12) United States Patent
Norris et al.

(10) Patent No.: US 11,710,019 B2
(45) Date of Patent: Jul. 25, 2023

(54) METHOD AND SYSTEM FOR DISPLAYING EQUIPMENT FAULT CODE DIAGNOSTIC INFORMATION

(71) Applicant: LOFA Industries, LLC, Roswell, GA (US)

(72) Inventors: Frank Hilton Norris, Suwanee, GA (US); Brett Allen Davis, Suwanee, GA (US); John Edward Geertsema, Jr., Sandy Springs, GA (US); Christopher Brian Perry, Duluth, GA (US)

(73) Assignee: Cattron North America, Inc., Warren, OH (US)

( * ) Notice: Subject to any disclaimer, the term of this patent is extended or adjusted under 35 U.S.C. 154(b) by 0 days.

(21) Appl. No.: 16/847,879

(22) Filed: Apr. 14, 2020

(65) Prior Publication Data

US 2021/0103785 A1    Apr. 8, 2021

Related U.S. Application Data

(63) Continuation of application No. 16/593,243, filed on Oct. 4, 2019.

(51) Int. Cl.
*G06K 19/06* (2006.01)
*G06F 3/14* (2006.01)

(52) U.S. Cl.
CPC ......... *G06K 19/06037* (2013.01); *G06F 3/14* (2013.01)

(58) Field of Classification Search
CPC ................................ G06K 19/06037
USPC ............................................ 235/494
See application file for complete search history.

(56) References Cited

U.S. PATENT DOCUMENTS

| | | | |
|---|---|---|---|
| 2002/0007805 A1* | 1/2002 | Green | F02D 19/105 123/27 GE |
| 2006/0288260 A1 | 12/2006 | Xiao | |
| 2013/0186070 A1* | 7/2013 | Daiker | F01N 3/08 60/274 |
| 2014/0246488 A1* | 9/2014 | Terwilliger | G06Q 20/3276 235/375 |
| 2018/0322714 A1* | 11/2018 | Gennotte | G07C 5/0808 |
| 2018/0346150 A1* | 12/2018 | Remond | B64F 5/60 |

* cited by examiner

*Primary Examiner* — Rafferty D Kelly
(74) *Attorney, Agent, or Firm* — Harness, Dickey & Pierce, P.L.C.; Anthony G. Fussner

(57) ABSTRACT

Techniques are disclosed for providing information describing a fault code for an object. A display device having an electronic display detects a fault occurrence event in the object. The display device determines a fault code indicative of the fault occurrence event and one or more parameters associated with the fault code. The display device generates a machine-readable code representing the fault code and the one or more parameters.

20 Claims, 6 Drawing Sheets

METHOD AND SYSTEM FOR DISPLAYING EQUIPMENT FAULT CODE DIAGNOSTIC INFORMATION

CROSS-REFERENCE TO RELATED APPLICATION

The present application is a Continuation of application Ser. No. 16/593,243, filed Oct. 4, 2019; which claims benefit of U.S. provisional patent application No. 621741,818, filed Oct. 5, 2018, entitled METHOD AND SYSTEM FOR DISPLAYING EQUIPMENT FAULT CODE DIAGNOSTIC INFORMATION, and commonly assigned to the assignee of the present application, the disclosure of which is incorporated by reference in its entirety herein.

FIELD

Embodiments presented herein generally relate to control systems, and more specifically, to techniques for displaying information elating to a fault code.

BACKGROUND

Fault detection and diagnosis in objects such as diesel engines are a known concern. Many engines may include a control system that detects engine failure. The control system may include a display panel that informs an operator of a current status, such as whether the engine is operational or undergoing a failure. Currently, many faults are documented through universal fault codes. For example, control systems may implement the J1939 diagnostic code standard, known to those skilled in the art. Such fault codes allow a display panel to inform the operator of the nature of a given fault. Doing so enables the operator to diagnose issues and solutions to address the fault.

However, industrial display devices are typically subject to physical constraints, such as in display size and memory. Oftentimes, this is by design to account for cost considerations, Consequently, however, such devices are potentially incapable of producing meaningful information for an operator to appropriately diagnose issues with an engine in the event of a fault. For example, some display devices, at most, may only be able to display the fault code in the event of an engine failure. However, without any additional context, the user might not be able to successfully identify a problem with the engine.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

Embodiments presented herein disclose a computer-implemented method for providing information describing a fault code for an object. The method generally includes detecting, by execution of one or more processors of a display device having an electronic display, a fault occurrence event in the object. In exemplary embodiments, the method also generally includes determining a fault code indicative of the fault occurrence event and one or more parameters associated with the fault code. In exemplary embodiments, the method also generally includes generating a machine-readable code representing the fault code and the one or more parameters.

Another exemplary embodiment presented herein discloses a display device comprising one or more processors and a memory storing instructions, which, when executed on the one or more processors, causes the display device to detect a fault occurrence event in an object, determine a fault code indicative of a fault occurrence event and one or more parameters associated with the fault code, and generate a machine-readable code representing the fault code and the one or more parameters.

Yet another exemplary embodiment presented herein discloses a method for identifying a fault code description for generation of a corresponding machine-readable code. Such method generally includes receiving, by execution of one or more processors and from a device, a fault code indicative of a fault occurrence event for an object. This method also generally includes performing a lookup function in a database using the fault code as input. This method also generally includes, in response to the fault code being valid, returning a fault code description obtained from the database by the lookup function to the device for generation of a corresponding machine-readable code.

BRIEF DESCRIPTION OF THE DRAWINGS

The drawings disclose exemplary embodiments in which like reference characters designate the same or similar parts throughout the figures of which.

DETAILED DESCRIPTION

Figure 1:
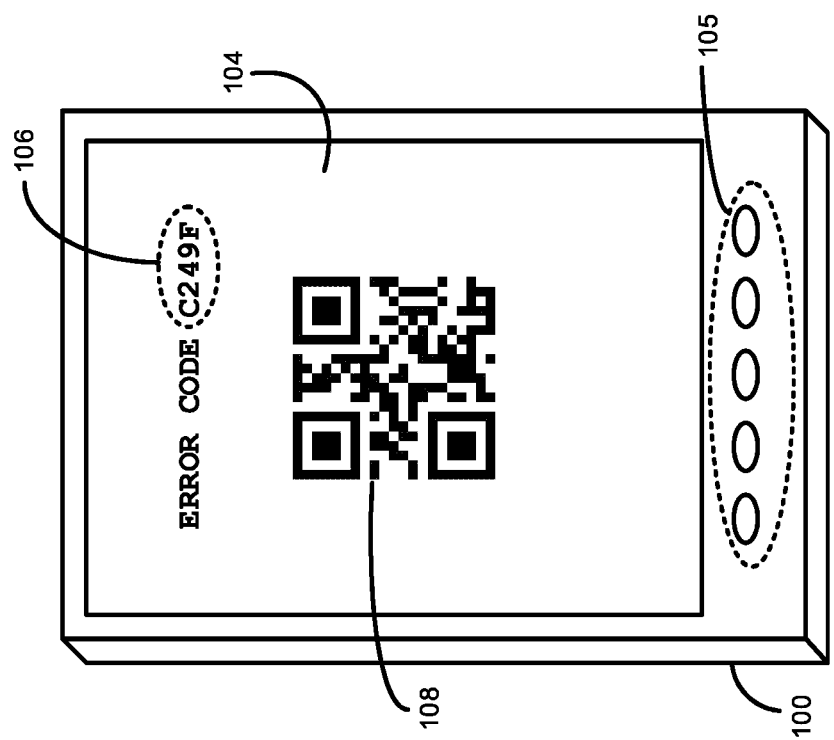
FIG. 1 is a perspective schematic view of a display device panel used to monitor an engine.

Unless otherwise indicated, the drawings are intended to be read (for example, cross-hatching, arrangement of parts, proportion, degree, or the like) together with the specification, and are to be considered a portion of the entire written description of this invention. As used in the following description, the terms "horizontal", "vertical", "left", "right", "up" and "down", "upper" and "lower" as well as adjectival and adverbial derivatives thereof (for example, "horizontally", "upwardly", or the like), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Exemplary embodiments presented herein disclose techniques for providing fault code diagnostic information for an object being monitored, such as, but not limited to, an engine. As further disclosed herein, embodiments provide a display device of a control panel that monitors the engine.

The display device generates a machine-readable code (e.g., a Quick Response (QR) code) representative of the fault code and static and dynamic parameters associated with the underlying fault. Thereafter, a mobile device may scan the machine-readable code to retrieve, on the mobile device, additional information regarding the fault code. Doing so allows the mobile device to retrieve information relating to the fault code from a database storing such information. The mobile device may present the retrieved information on a display of the mobile device.

Advantageously, an operator of the engine may obtain meaningful information regarding a fault code through such an approach. Because control panel display devices typically have a relatively small display size to present any meaningful information beyond the fault code, the mobile device can instead display detailed information for the operator, allowing the operator evaluate any issues relating to the engine. In addition, by generating a machine-readable code from multiple parameters including the fault code, various data, relating to the engine can be included with the code, such as, but not limited to, a timestamp of the error, an amount of time that the engine has been in operation, a make and model number of the engine, and the like. Further, using a mobile device that has network connectivity allows fault code information to be obtained over the network, in cases where the display device or engine does not have network connectivity to provide such information. For instance, assume that the control panel display device is located in an area with relatively low network connectivity. In such a case, the mobile device may capture the machine-readable code and, once the mobile device reaches an area with relatively higher connectivity, the mobile device can obtain information relating to the fault code.

Note, the following references a diesel engine as a type of object that may be configured with a control panel having a display device that presents monitoring information on the display device and generates machine-readable codes corresponding to fault codes relating to issues occurring on the engine. Of course, one of skill in the art will recognize that embodiments presented herein may be adapted to a variety of objects, such as, but not limited to, control panel displays on vehicular systems, medical devices, and industrial equipment.

Referring now to FIG. 1, a display device 100 according to one exemplary embodiment is shown. The display device 100 is representative of a control panel of an underlying control system to monitor and control an electronically governed engine, such as, but not limited to, a diesel engine. As shown, the display device 100 includes an electronic display 104 and a number of controls 105.

The display 104 may be embodied as any type of hardware to present data relating to monitoring, diagnostics, and control of the diesel engine as well as machine-readable code relating to fault codes. For example, the display 104 may be embodied as a variety of electronic displays, such as, but not limited to, a liquid crystal display (LCD) panel, a light-emitting diode display, and the like. Further, the display 104 may provide features such as, but not limited to, a relatively high contrast display, backlight support, configurable display units, service timers, multi-language support, and so on.

The controls 105 may be embodied as any type of hardware to control settings and features in the display 104. For example, the controls 105 may be embodied as tactile buttons that an operator may press to configure parameters such as, but not limited to, an engine idle speed, a minimum and maximum revolutions per minute language settings, timer settings, and so on.

Illustratively, FIG. 1 depicts, on the display 104, a fault code 106 and a machine-readable code 108 being presented. As noted, the display 104 may present diagnostic codes after events such as, but not limited to, a detection of fault occurrence in the engine, an event in response to encountering a debug checkpoint, an event in response to a diagnostics test by an external device, and the like. In an embodiment, the display 104 may show J1939 diagnostic codes and emission icons. However, an operator may have difficulty identifying a meaning of the fault code, as the display size of display 104 may be too small to present detailed information regarding the code. Further, fault code definitions may occasionally be updated or modified with new information and solutions.

In one exemplary embodiment, the display 104 includes code generator logic to create machine-readable code that may be scanned by a device, such as, but not limited to, a mobile device of an operator of the engine. As shown, the machine-readable code 108 is a QR code that may include an address, such as, but not limited to, a network address such as a uniform resource locator (URL) or a local address to be referenced by a mobile application, that the mobile device may use to access a fault code information database to retrieve information of the fault code relative to the engine. Note, although the present disclosure describes the machine-readable code 108 as a QR code, other types of machine-readable codes now existing or hereafter developed may be used, such as, but not limited to, barcodes, matrix barcodes, PDF417 barcodes, Aztec codes, and the like.

Figure 2:
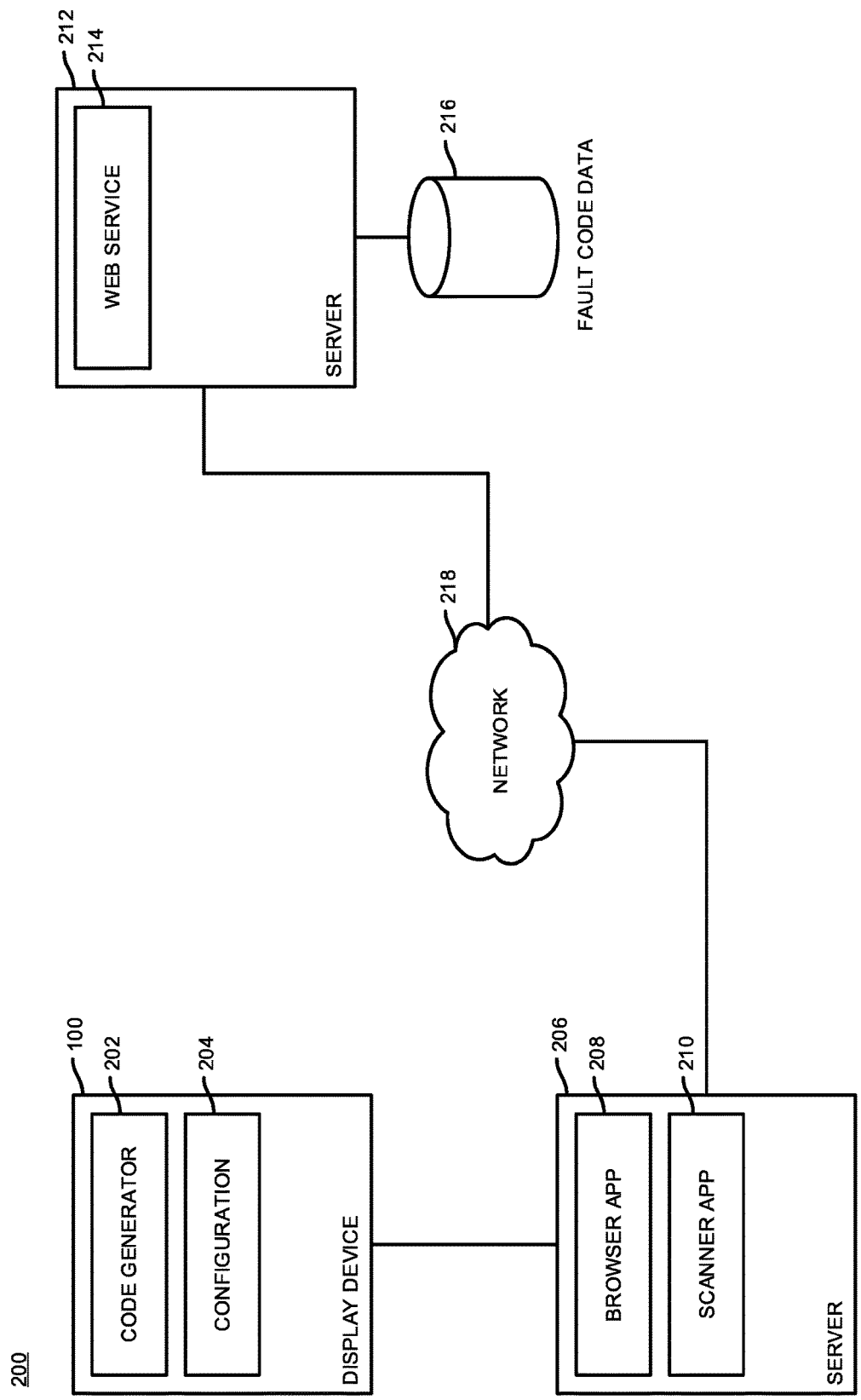
FIG. 2 is a flow diagram of a computing environment in which information regarding a fault code is displayed on a mobile device according to one exemplary embodiment.

For example, turning now to FIG. 2, one exemplary embodiment of a computing environment in which fault code information can be displayed on a mobile device 206 is shown. The environment includes the display device 100, the mobile device 206, and a server 212. The mobile device 206 is representative of any type of device that can scan the machine-readable code 108. For instance, the mobile device 206 can be a portable device, such as, but not limited to, a smartphone device, tablet computer, barcode scanner, and the like. The mobile device 206 and the server are interconnected via a network 218 (e.g., the Internet). In exemplary embodiments, the display device 100 may be configured with capability to connect to the network 218.

The illustrative mobile device 206 includes a code generator 202 and a configuration 204. The code generator 202 may be a set of instructions, which, when executed, generate a machine-readable code to be scanned by the mobile device 206. Further, the code generator 202 may generate the machine-readable code as a function of multiple parameters including a fault code. For example, the code generator 202 may obtain additional parameters from the configuration 204. The configuration 204 may be embodied as any type of information relating to the underlying engine and display device 100, such as, but not limited to, the engine make and model, serial numbers for the make and model, a firmware version of the display device 100, a geolocation associated with the engine, a current language setting for the display device 100, and the like. In addition, the code generator 202 may obtain parameters relating to the fault, such as, but not limited to, a date and time in which the fault was generated.

As shown, the mobile device 206 includes one or more software applications ("app(s)"), such as, but not limited to, a browser app 208 and a scanner app 210. The browser app 208 is an application that renders websites for display on the mobile device 206. The browser app 208 may receive, as input, a network address, such as (but not limited to) a URL, and load the webpage on the mobile device 206. The scanner app 210 is an application that may read machine-readable code, such as machine-readable code 104. The scanner app 210 accesses a camera in the mobile device 206 and, when the camera is positioned to focus on the machine-readable code 104, detects the machine-readable code 104. The scanner app 210 may interpret the underlying address provided by the code. The browser app 208 may then receive the address as input to access a target website, such as a website provided by the server 212.

The server 212 may be representative of a physical computing system or a virtual computing instance in the cloud. As shown, the server 212 includes a web service 214 and fault code data 216. The fault code data 216 may be embodied as any database or database table structure that provides definitions and other information regarding fault codes for a number of engines and engine models. The information may be provided in a number of languages and can be specific to a given region in which the engine is sold or used.

The web service 214 may be embodied as any type of hardware, software, or circuitry to process web access requests and provide content for display on a web browser. In one exemplary embodiment, the service 214 receives web access requests from the browser app 208 via the address retrieved from the machine-readable code 104. In an embodiment, the address provided to the web service 214 is formatted such that the web service 214 can parse and extract the fault code and parameters from the address and perform a lookup function in the fault code data 216 using the parameters as input. For example, given only the fault code, the web service 214 may retrieve a general description of the underlying fault and provide the information in a format presentable by the browser app 208, such as, but not limited to, a JavaScript Object Notation (JSON) or Hypertext Markup Language (HTML) format. As another example, given additional parameters, such as the language setting for the display device 100, the web service 214 may retrieve the general description for the fault code in the specified language. As yet another example, given additional parameters, such as, but not limited to, serial numbers for the make and model of the engine, the web service 214 may retrieve fault code information specific to that make and model.

As an example approach to address character limitations of machine-readable code generation, the code generator 200 may apply address shortening techniques (e.g., URL shortening techniques) to satisfy such limitations. Although FIG. 1 depicts the fault code data 216 as residing on a server 212 that is remote from the mobile device 206, the fault code data 216 may also reside locally on the mobile device 206. For example, a mobile app executing on the mobile device 206 can provide database functions for access into the fault code data 216. Further, the mobile app may interpret parameters in the machine-readable code 106 to perform a lookup operation, Doing so eliminates network usage to obtain information regarding a given fault code.

Figure 3:
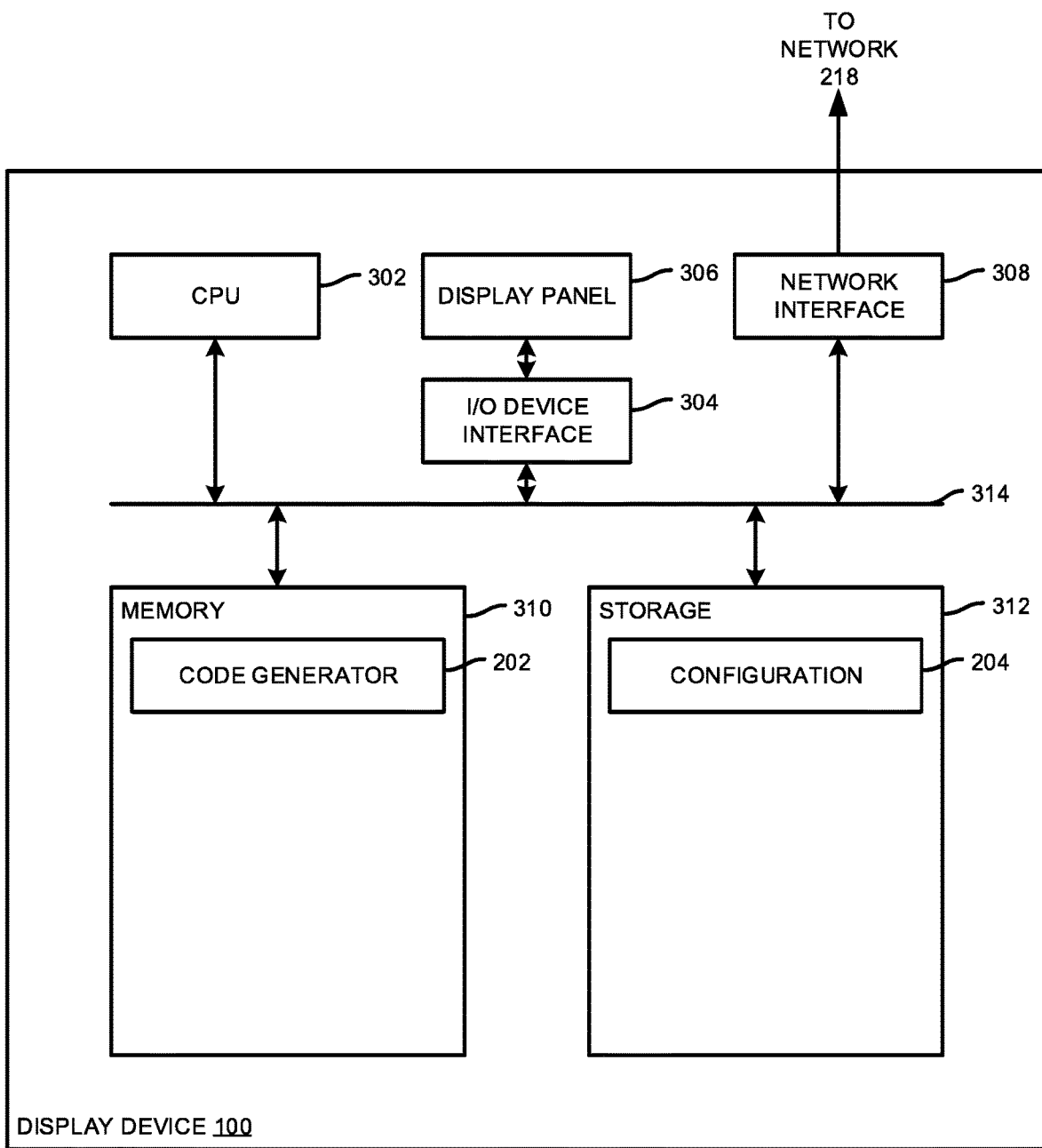
FIG. 3 is a flow diagram of the display device of FIG. 1 according to one exemplary embodiment.

Referring now to FIG. 3, hardware and software components of the display device 100 according to one exemplary embodiment are shown. As shown, the display device 100 includes, without limitation, a central processing unit (CPU) 302, an I/O device interface 304, a display panel 306, a controller interface 308, a memory 310, and a storage 312. Each of these components may be interconnected via an interconnect bus 314.

The CPU 302 retrieves and executes programming instructions stored in memory 310 as well as stores and retrieves application data residing in the storage 312 (e.g., the configuration 204). The bus 314 is used to transmit programming instructions and data between CPU 302, storage 312, controller interface 308, and memory 310. The CPU 302 is included to be representative of a single CPU, multiple CPUs, a single CPU having multiple processing cores, and the like. The memory 310 is generally included to be representative of a random access memory. The storage 310 may be a disk drive storage device. Although shown as a single unit, storage 312 may be a combination of fixed and/or removable storage devices, such as fixed disc drives, removable memory cards, or optical storage, network attached storage (NAS), or a storage area network (SAN).

The I/O device interface 304 allows various I/O devices, such as the display panel 306, to connect with the display device 100 and communicate with hardware and software components of the display device 100. The display panel 306 may be an LCD or LED display, as described above. The controller interface 206 may be embodied as any communication circuit, device, or collection thereof, capable of enabling communications between engine components (e.g., controllers and sensors) and the components of display device 100. The memory 208 further includes the code generator 202. The storage 312 includes the configuration 204.

Figure 4:
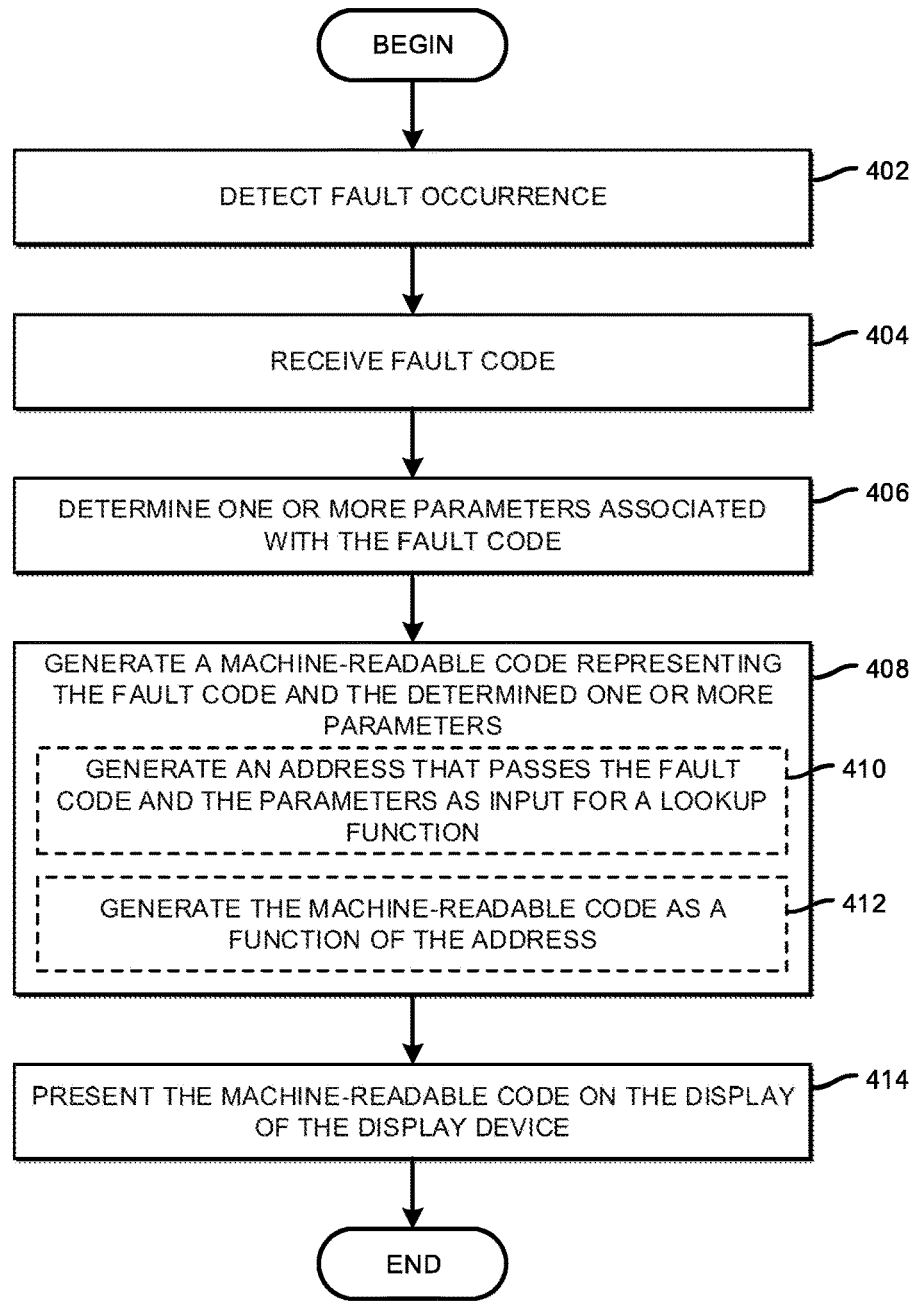
FIG. 4 is a block diagram of a method for generating a machine-readable code according to one exemplary embodiment.

Referring now to an exemplary embodiment of a method as shown in FIG. 4, the display device 100, in operation, performs a method 400 for generating a machine-readable code (e.g., a scannable code such as, but not limited to, a QR code). As shown, the method 400 begins in block 402, in which the display device 100 detects a fault occurrence using a variety of fault detection techniques. In block 404, the display device 100 receives the corresponding fault code. Further, in block 406, the display device 100 determines one or more parameters associated with the fault code. For example, the display device 100 may identify a date and time in which the fault code occurred, settings associated with the engine (e.g., language, geolocation, make and model serial numbers, etc.).

In block 408, the display device 100 generates a machine-readable code representing the fault code and the determined parameters. For example, in block 410, the display device 100 may generate an address that passes the fault code and the parameters as input for a lookup function to a database storing fault code information. Further, in block 412, the display device 100 generates the machine-readable code as a function of the address. As stated, the display device 100 may apply address shortening techniques to avoid character limitations of machine-readable code generation techniques. The mobile device 206 may then scan the generated machine-readable code to reproduce the address thereon. The mobile device 206 may then access the website provided by the address to obtain detailed information regarding the fault code.

Figure 5:
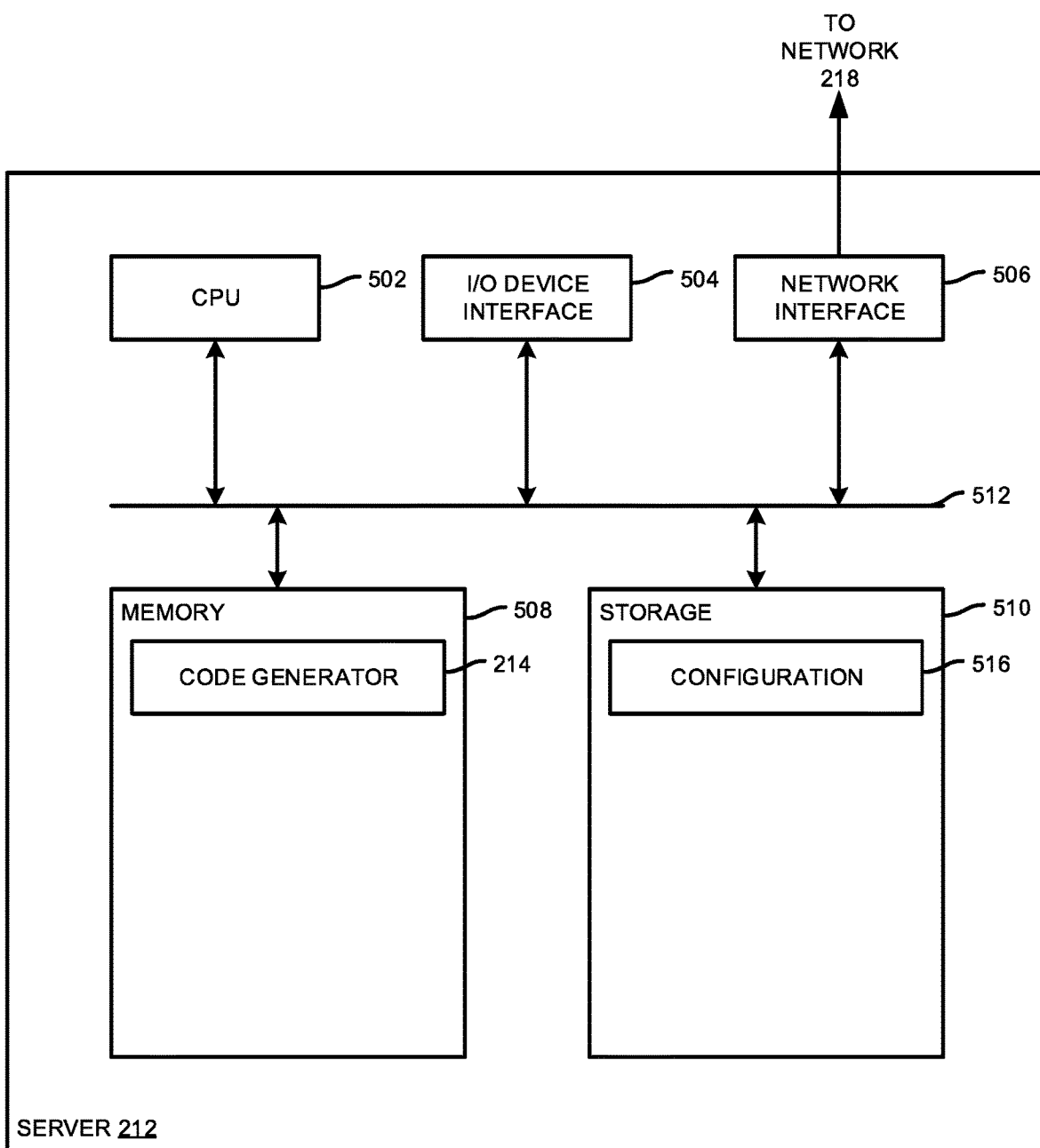
FIG. 5 is a block diagram of the server of FIG. 2 according to one exemplary embodiment; and, FIG. 6 is a flow diagram of a method for processing a request to retrieve information describing a fault code according to one exemplary embodiment.

Referring now to FIG. 5, one exemplary embodiment of hardware and software components of the web server 212 are shown. The web server 212 may include, without limitation, a CPU 502, an I/O device interface 504, a network interface 506, a memory 258, and a storage 510. Each of these components may be interconnected via an interconnect bus 512.

The CPU 502 retrieves and executes programming instructions stored in memory 508 as well as stores and retrieves application data residing in the storage 510 (e.g., fault code data 216). The bus 512 is used to transmit programming instructions and data between CPU 502, storage 510, network interface 506, and memory 508. The CPU 502 is included to be representative of a single CPU, multiple CPUs, a single CPU having multiple processing cores, and the like. The memory 508 is generally included to be representative of a random access memory. The storage 510 may be a disk drive storage device. Although shown as a single unit, storage 510 may be a combination of fixed and/or removable storage devices, such as fixed disc drives, removable memory cards, or optical storage, network attached storage (NAS), or a storage area network (SAN).

The I/O device interface 504 allows various I/O devices (e.g., keyboards, mouse devices, and the like) to connect with the server 212 and communicate with hardware and software components of the server 212. The network interface 506 may be embodied as any communication circuit, device, or collection thereof, capable of enabling communications over a network (e.g., a local area network, the Internet, etc.) between the server 212 and other devices, such as the mobile device 206. The memory 508 includes the web service 214. The storage 510 includes the fault code data 216.

Figure 6:
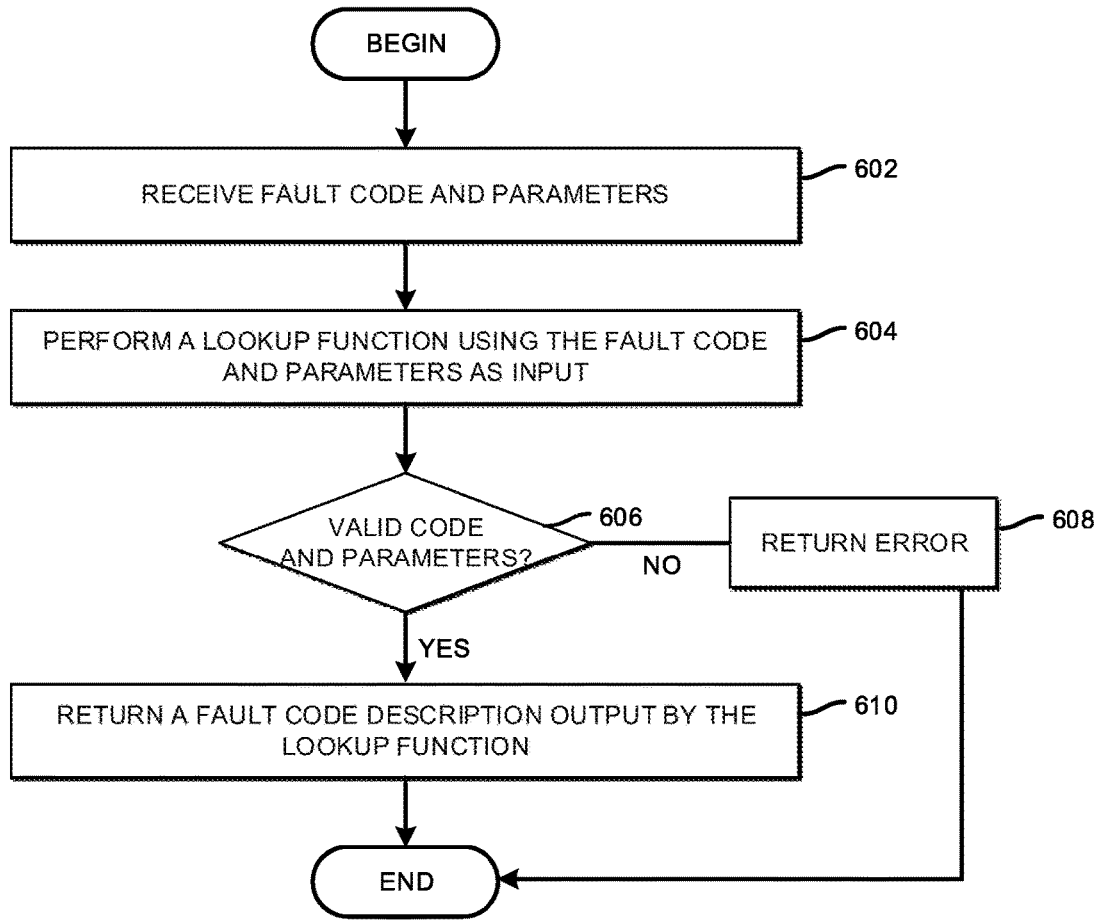

Referring now to FIG. 6, the web server 212, in operation, may perform a method 600 for processing a request to retrieve information describing a fault code. In this exemplary embodiment, assume that an operator of an engine scanned the machine-readable code presented by the display device 100, in which the machine-readable code is representative of a fault code. Assume also that the machine-readable code was generated as a function of the fault code and additional parameters, The mobile device 206 may pass the fault code and parameters to the web server 212. In block 602, the web server 212 receives the fault code and parameters.

In block 604, the web server 212 performs a lookup function (e.g., a database operation) using the fault code and parameters as input. In block 606, the web server 606 determines whether the fault code and parameters passed through the lookup function are valid. The fault code may be invalid if the code does not exist in the fault code data 216. In such a case, in block 608, the web server 212 returns an error to the mobile device 206. Otherwise, if so, then in block 610, the web server 212 returns the fault code description that is output by the lookup function. The web server 212 may generate a webpage including such information that may be rendered by a web browser, such as a browser app 208.

While the methods, equipment and systems have been described in connection with specific embodiments, it is not intended that the scope be limited to the particular embodiments set forth, as the embodiments herein are intended in all respects to be illustrative rather than restrictive.

Unless otherwise expressly stated, itis in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used in the specification and the appended claims the singular forms "a," "an", and "the" include plural referents unless the context clearly dictates otherwise.

What is claimed is:

1. A computer-implemented method for providing information describing a machine-readable code for a stationary, and thereby immovable, internal-combustion engine, the computer-implemented method comprising:
   detecting, by execution of one or more processors of a display device in communication with the stationary internal-combustion engine and having an electronic display, an event in the stationary internal-combustion engine, the stationary internal-combustion engine operating through the combustion of a petroleum-based fuel;
   determining the machine-readable code indicative of the event and one or more parameters associated with the machine-readable code;
   generating the machine-readable code representing the event and the one or more parameters; and
   displaying the machine-readable code on the display device,
   wherein a control panel includes the display device and is operable for monitoring the stationary internal-combustion engine; and
   wherein determining the one or more parameters associated with the machine-readable code comprises determining a geolocation associated with the stationary internal-combustion engine.

2. The computer-implemented method of claim 1, further comprising presenting the machine-readable code on the electronic display of the display device of the control panel that monitors the stationary internal-combustion engine.

3. The computer-implemented method of claim 1, wherein generating the machine-readable code comprises:
   generating an address that passes the event and the one or more parameters as input to a lookup function; and
   generating the machine-readable code as a function of the generated address.

4. The computer-implemented method of claim 1, wherein generating the machine-readable code comprises generating a Quick Response (QR) code representing the event and the one or more parameters.

5. The computer-implemented method of claim 1, wherein detecting the event comprises detecting a fault occurrence event.

6. The computer-implemented method of claim 1, wherein determining the one or more parameters associated with the machine-readable code comprises determining at least one of a timestamp indicative of when the event was detected and a serial number associated with the stationary internal-combustion engine.

7. The computer-implemented method of claim 1, wherein generating the machine-readable code representing the event and the one or more parameters comprises generating a machine-readable code representing one or more dynamic parameters uniquely associated with the event and the stationary internal-combustion engine.

8. The computer-implemented method of claim 7, wherein generating the machine-readable code comprises generating a Quick Response (QR) code representing the event and the one or more dynamic parameters.

9. The computer-implemented method of claim 1, wherein:
   detecting the event comprises detecting a fault occurrence event;

determining the machine-readable code comprises determining a fault code indicative of the fault occurrence event and one or more parameters associated with the fault code; and generating the machine-readable code comprises generating a machine-readable code representing the fault code and the one or more parameters.

10. The computer-implemented method of claim 9, wherein generating the machine-readable code comprises generating a Quick Response (QR) code representing the fault code and the one or more parameters.

11. The computer-implemented method of claim 1, wherein:

detecting the event comprises detecting a fault occurrence event;

determining the machine-readable code comprises determining a fault code indicative of the fault occurrence event and one or more dynamic parameters associated uniquely associated with the fault code and the stationary internal-combustion engine; and generating the machine-readable code comprises generating a machine-readable code representing the fault code and the one or more dynamic parameters.

12. The computer-implemented method of claim 11, wherein generating the machine-readable code comprises generating a Quick Response (QR) code representing the fault code and the one or more dynamic parameters.

13. The computer-implemented method of claim 1, wherein detecting the event comprises detecting a fault occurrence event in a diesel engine.

14. The computer-implemented method of claim 1, wherein generating the machine-readable code comprises generating a machine-readable code readable by a mobile device.

15. The computer-implemented method of claim 1, wherein the method includes:

detecting the event comprises detecting a fault occurrence event;

determining the machine-readable code comprises determining a fault code indicative of the fault occurrence event; and performing a lookup function in a database using the fault code as input; and in response to the fault code being valid, returning a fault code description obtained from the database by the lookup function for generating a machine-readable code representing the fault code.

16. The computer-implemented method of claim 15, wherein:

determining the machine-readable code comprises determining one or more dynamic parameters associated uniquely associated with the fault code and the stationary internal-combustion engine; and performing the lookup function in the database further includes using the one or more dynamic parameters as input.

17. The computer-implemented method of claim 16, wherein the method includes displaying an error on the display device in response to the fault code and/or the one or more dynamic parameters being invalid.

18. The computer-implemented method of claim 15, wherein the method includes displaying an error on the display device in response to the fault code being invalid.

19. A display device configured to be operable for implementing the method according to claim 1.

20. A control panel for monitoring the stationary internal-combustion engine, the control panel including the display device and configured to be operable for implementing the method according to claim 1.

* * * * *